United States Patent
Burges et al.

(10) Patent No.: US 10,346,453 B2
(45) Date of Patent: Jul. 9, 2019

(54) MULTI-TIERED INFORMATION RETRIEVAL TRAINING

(75) Inventors: Chris J. C. Burges, Bellevue, WA (US); Krysta M. Svore, Seattle, WA (US); Maksims Volkovs, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 852 days.

(21) Appl. No.: 12/974,704

(22) Filed: Dec. 21, 2010

(65) Prior Publication Data

US 2012/0158710 A1    Jun. 21, 2012

(51) Int. Cl.
  *G06F 16/33*     (2019.01)
  *G06F 16/332*    (2019.01)
  *G06N 20/00*     (2019.01)

(52) U.S. Cl.
  CPC ...... *G06F 16/3347* (2019.01); *G06F 16/3326* (2019.01); *G06N 20/00* (2019.01)

(58) Field of Classification Search
  CPC .................... G06F 16/3326; G06F 16/3347
  USPC ......................................................... 707/748
  See application file for complete search history.

(56) References Cited

U.S. PATENT DOCUMENTS

| | | | |
|---|---|---|---|
| 6,928,452 B2 | 8/2005 | De La Huerga | |
| 7,409,404 B2* | 8/2008 | Gates | |
| 7,472,096 B2 | 12/2008 | Burges et al. | |
| 7,937,345 B2* | 5/2011 | Schmidtler et al. | ............ 706/20 |
| 8,266,014 B1* | 9/2012 | Bhosle et al. | ............... 705/26.7 |
| 8,606,724 B2* | 12/2013 | Cheng et al. | .................... 706/12 |
| 9,449,078 B2* | 9/2016 | Wang | ................. G06F 16/3326 |
| 2005/0144149 A1* | 6/2005 | Li et al. | .......................... 706/12 |
| 2005/0216511 A1 | 9/2005 | Umezu et al. | |
| 2006/0059134 A1* | 3/2006 | Palmon et al. | .................... 707/3 |
| 2007/0150465 A1* | 6/2007 | Brave | ............... G06F 17/30867 |
| 2007/0239632 A1* | 10/2007 | Burges | .................. G06N 20/00 706/15 |
| 2008/0082481 A1* | 4/2008 | Joshi et al. | ....................... 707/2 |
| 2008/0172375 A1* | 7/2008 | Burges | .............. G06F 17/30675 |

(Continued)

OTHER PUBLICATIONS

Emam et al, "Toward a multi-tier index for information retrieval system", Retrieved at << http://www.wseas.us/e-library/conferences/2005prague/papers/493-212.pdf >>,2005, pp. 9.

(Continued)

*Primary Examiner* — James Trujillo
*Assistant Examiner* — Kurt A Mueller
(74) *Attorney, Agent, or Firm* — Workman Nydegger

(57) ABSTRACT

Methods and systems for multi-tiered information retrieval training are disclosed. A method includes identifying results in a ranked ordering of results that can be swapped without changing a score determined using a first ranking quality measure, determining a first vector and at least one other vector for each identified swappable result in the ranked ordering of results based on the first ranking quality measure and at least one other ranking quality measure respectively, and adding the first vector and the at least one other vector for each identified swappable result in the ranked ordering of results to obtain a function of the first vector and the at least one other vector. Access is provided to the function of the first vector and the at least one other vector for use in the multi-tiered information retrieval training.

18 Claims, 5 Drawing Sheets

(56) References Cited

U.S. PATENT DOCUMENTS

| | | |
|---|---|---|
| 2009/0006357 A1* | 1/2009 | Popescul et al. ................. 707/5 |
| 2009/0089274 A1 | 4/2009 | Chapelle |
| 2009/0204339 A1* | 8/2009 | Shams et al. .................... 702/19 |
| 2009/0248667 A1* | 10/2009 | Zheng .................... G06F 16/337 |
| 2009/0248668 A1* | 10/2009 | Zheng ............... G06F 17/30675 |
| 2010/0076911 A1* | 3/2010 | Xu .......................... G06N 20/00 706/12 |
| 2010/0161617 A1 | 6/2010 | Cao et al. |
| 2011/0016065 A1* | 1/2011 | Chapelle .............. G06N 99/005 706/12 |
| 2011/0099131 A1* | 4/2011 | Sellamanickam ........................... G06F 17/30707 706/12 |
| 2011/0145175 A1* | 6/2011 | Agarwal ................ G06N 20/00 706/12 |

OTHER PUBLICATIONS

"Introduction to information retrieval", Retrieved at << http://www.stanford.edu/class/cs276/handouts/lecture7-vectorspace.pdf >>, pp. 8.

* cited by examiner

MULTI-TIERED INFORMATION RETRIEVAL TRAINING

BACKGROUND

Information retrieval (IR) is the science of searching for documents, for information within documents, and for metadata about documents, as well as of searching relational databases and the Internet. Internet search engines are the most visible type of IR applications. IR applications use ranking models that are produced by algorithms that are trained to rank identified information sources (such as documents, urls, etc.). These algorithms are commonly called "learning to rank algorithms".

Learning to rank algorithms automatically construct ranking models from training data. The training data is used by the learning to rank algorithms to produce a ranking model which determines the relevance of information sources to actual queries. The purpose of the ranking model is to rank unseen lists of information sources in a manner that is similar to rankings that are present in the training data. Conventional learning to rank algorithms include lambda gradient type learning to rank algorithms among others.

Lambda gradient type learning to rank algorithms determine "lambdas" or "gradients" for identified information sources or "results" and use the gradients to improve the ranking model during training of the learning to rank algorithm. The gradients are associated with the results and indicate a direction and extent to which a result in a ranked ordering of results is desired to move within the ranked ordering. Lambda gradient type learning to rank algorithms are trained iteratively, and at each iteration, the gradients (lambdas) are re-calculated after results in a ranked ordering of results have been sorted, based on the scores assigned by the model at the current training iteration.

The gradients are determined by pairing individual results in a sorted list of results with other results in the sorted list of results and determining the contribution of the individual results to each of the pairings. The contributions (which can be positive or negative) of an individual result to each of its pairings are summed to obtain a gradient for that result. More formally, where a given feature vector is called y, then the gradient at y is the derivative of a cost function with respect to the ranking model score, evaluated at y.

The gradients are utilized during a given training iteration as follows, where documents D1 and D2 are results in a ranked ordering of results that have gradients X determined for them, and D2 is more relevant than D1, by virtue of the determination of the aforementioned gradients, D1 will get a push downward (in the ranked ordering of results) of magnitude |X| and D2 will get a push upward of equal and opposite magnitude. However, where D2 is less relevant than D1, D1 will get a push upward (in the ranked ordering of results) of magnitude |X| and D2 will get a push downward of equal and opposite magnitude.

Ranking quality measures or "metrics" may be used to determine how well a learning to rank algorithm is performing on training data and to compare the performance of different learning to rank algorithms. Ranking quality measures include Mean Reciprocal Rank (MRR), Mean Average Precision (MAP), Expected Reciprocal Rank (ERR) and Normalized Discounted Cumulative Gain (NDCG). These metrics generate a score that provides a measure of the ranking quality of the learning to rank algorithm. In many training applications, learning to rank problems are formulated as optimization problems with respect to one of the metrics, where training is continued until improvement in the score provided by the metric has been maximized.

Training learning to rank algorithms using conventional methodologies has some significant shortcomings. For example, some learning to rank algorithms may assign a particular relevance label (e.g., relevant, not as relevant, not relevant) to more than one result without adequate means of distinguishing the results that are assigned the same relevance label. In addition, some learning to rank algorithms have inadequate mechanisms for accurately gauging user intent. Accordingly, the effectiveness of the ranking models that are generated from such algorithms can be limited.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Many conventional information retrieval training systems do not include adequate means of ranking identified information sources or "results" that are assigned the same relevance label or of accurately gauging user intent. A vector training methodology that addresses such shortcomings by using multiple ranking quality metrics that measure such characteristics is disclosed. However, the claimed embodiments are not limited to implementations that solve any or all of the aforementioned shortcomings. As part of the disclosed methodology, results in a ranked ordering of results are identified that can be swapped without changing a score that is determined by a first ranking quality measure, a first vector and at least one other vector is determined for each identified swappable result in the ranked ordering of results based on the first ranking quality measure and at least one other ranking quality measure (for example a measure that is based on user click data for each result) respectively, and the first vector and the at least one other vector are combined for each identified swappable result in the ranked ordering of results to obtain a function of the first vector and the at least one other vector. Thereafter, access is provided to the function of the first vector and the at least one other vector for use in multi-tiered information retrieval training. Using the aforementioned methodology, vectors for results that are assigned the same relevance label (such as the swappable results discussed above) are determined not only based on assigned relevance labels (as are other results in the ranked ordering of results) but also on data that distinguishes the similarly labeled results and provides a measure of user intent.

DRAWINGS

The accompanying drawings, which are incorporated in and form a part of this specification, illustrate embodiments and, together with the description, serve to explain the principles of the embodiments:

The drawings referred to in this description are for illustration only and should not be understood as being drawn to scale except if specifically noted.

DETAILED DESCRIPTION

Reference will now be made in detail to various embodiments, examples of which are illustrated in the accompanying drawings. While descriptions will be provided in conjunction with these embodiments, it will be understood that the descriptions are not intended to limit the scope of the embodiments. On the contrary, the disclosure is intended to cover alternatives, modifications and equivalents, of these embodiments. Furthermore, in the following description, numerous specific details are set forth in order to provide a thorough understanding of embodiments. In other instances, well-known methods, procedures, components, and circuits have not been described in detail as not to unnecessarily obscure aspects of embodiments.

Figure 1:
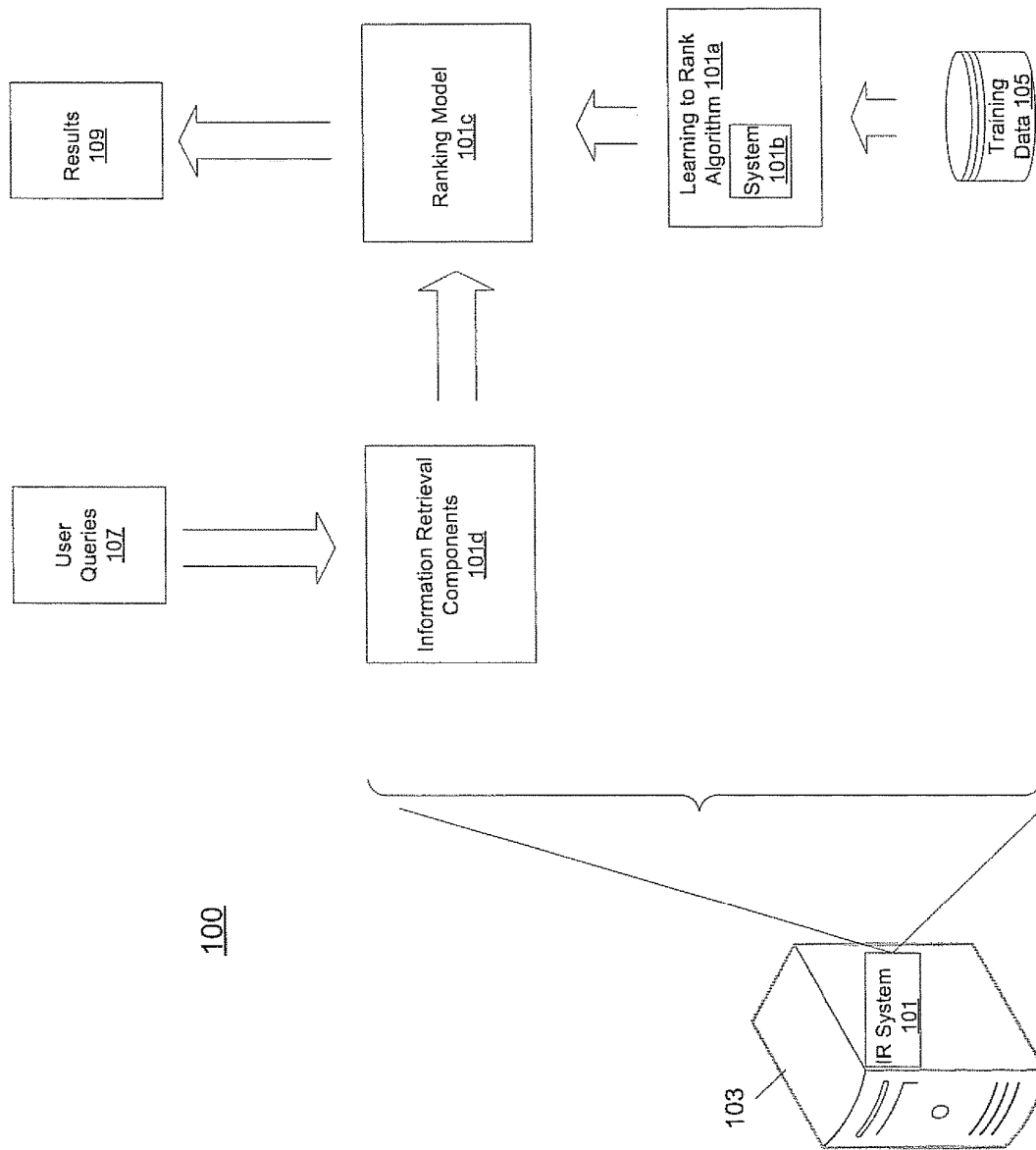
FIG. 1 shows an exemplary operating environment of a system for multi-tiered information retrieval training according to one embodiment.

Exemplary Operating Environment for Multi-Tiered Information Retrieval Training According to Embodiments FIG. 1 shows an exemplary operating environment 100 of a system 101b for multi-tiered information retrieval training according to one embodiment. In one embodiment, system 101b uses multiple ranking quality measures to train information retrieval (IR) system 101. As a part of its operation, system 101b determines vectors that indicate how a result is to move up or down in a ranked ordering of results in a manner that maximizes scoring provided by the multi-tiered relevance measures. As used herein the term "vector" is intended to refer to a direction and magnitude that may or may not be based on a cost function. The vectors for results assigned the same relevance label are determined not only based on assigned relevance labels (as are other results) but also on data that distinguishes the similarly labeled results and provides a measure of user intent. Consequently, a ranking model which reflects complementary attributes of multiple ranking quality measures is produced. In the FIG. 1 embodiment, exemplary operating environment 100 includes information retrieval system 101, learning to rank algorithm 101a, system 101b, ranking model 101c, information retrieval components 101d, computer system 103, training data 105, user queries 107 and results 109.

Referring to FIG. 1, information retrieval system 101 executes on computer system 103 and includes learning to rank algorithm 101a. In one embodiment, learning to rank algorithm 101a, upon training, produces ranking model 101c which is used to rank unseen lists of identified information sources (lists of identified information sources not from training data). In one embodiment, learning to rank algorithm 101a produces ranking model 101c based on a vector training methodology as described herein in detail.

System 101b identifies results in a ranked ordering of results that are generated by learning to rank algorithm 101a, that are to subsequently have a first and at least one other vector determined therefor based on a first and at least one other ranking quality measure respectively. After the first and at least one other vector is determined, system 101b directs the combining (e.g., adding) of the first and the at least one other vector in order to determine a function of these vectors (e.g., the function determines the actual vector direction and magnitude that is assigned to the corresponding result for training purposes). This function is used to construct ranking model 101c. In one embodiment, system 101b can be an integral part of learning to rank algorithm 101a (see FIG. 1). In other embodiments, system 101b can be separate from learning to rank algorithm 101a but operate cooperatively therewith.

As a part of the training process, learning to rank algorithm 101a generates ranked orderings of results (e.g., urls, documents, information within documents, metadata about documents, or other identified information sources that are ranked according to their relevance). Thereafter, a first and at least one other ranking quality measure are used to measure the quality of the results. In one embodiment, the first information retrieval ranking quality measure can be a normalized discounted cumulative gain (NDCG) measure and the at least one other information retrieval ranking quality measure can be a user click ranking quality measure. In other embodiments, other types of information retrieval ranking quality measures can be used.

As a part of the vector determining process, a first vector for each of the results in the aforementioned ranked ordering of results is determined based on the first ranking quality measure. Thereafter, system 101b identifies one or more pairs of results among the ranked ordering of results that can be swapped without changing the score provided by the first ranking quality measure. Then, system 101b directs the determination of at least one other vector based on at least one other ranking quality measure for the one or more pairs of results that can be swapped. Subsequently, system 101b directs the first vector for these results that is determined based on the first ranking quality measure to be combined with the at least one other vector for these results that is determined based on the at least one other ranking quality measure.

In one embodiment, after the vectors are combined for the aforementioned results, the vector training process proceeds. In particular, in one embodiment, the vector training process continues until ranking quality measure scores have been maximized.

In one embodiment, the training data 105 that is used by system 101 can consist of queries and identified information sources (such as urls, documents, etc.) that have been matched. In one embodiment, these information sources can be assigned a relevance degree (e.g., relevant, less relevant, not relevant, etc.) with respect to the queries. In one embodiment, training data 105 can be prepared manually by human assessors who examine results for some queries and determine the relevance of each result. However, training data 105 can also be derived automatically, such as from an analysis of, search results that receive user clicks, user dwell time and query chains. Other relevance related data that can be provided by search engines includes but is not limited to spamness (likelihood of being spam), freshness (recentness of data), and grammaticality (quality of the written language).

Referring again to FIG. 1, user queries 107 are received as inputs to information retrieval system 101 and constitute requests for the identification of information sources that are most relevant to user queries 107. In response, information retrieval components 101d of information retrieval system 101 identify such relevant sources of information.

Ranking model 101c is used to determine the relevance of information sources that are identified by information retrieval components 101d of information retrieval system 101. Ranking model 101c is configured to rank unseen lists of such identified information sources in a manner that is similar to rankings that are present in training data 105. The ordered ranking of identified information sources that is generated by ranking model 101c constitutes results 109 that can be presented to a system user.

Operation

Figure 2:
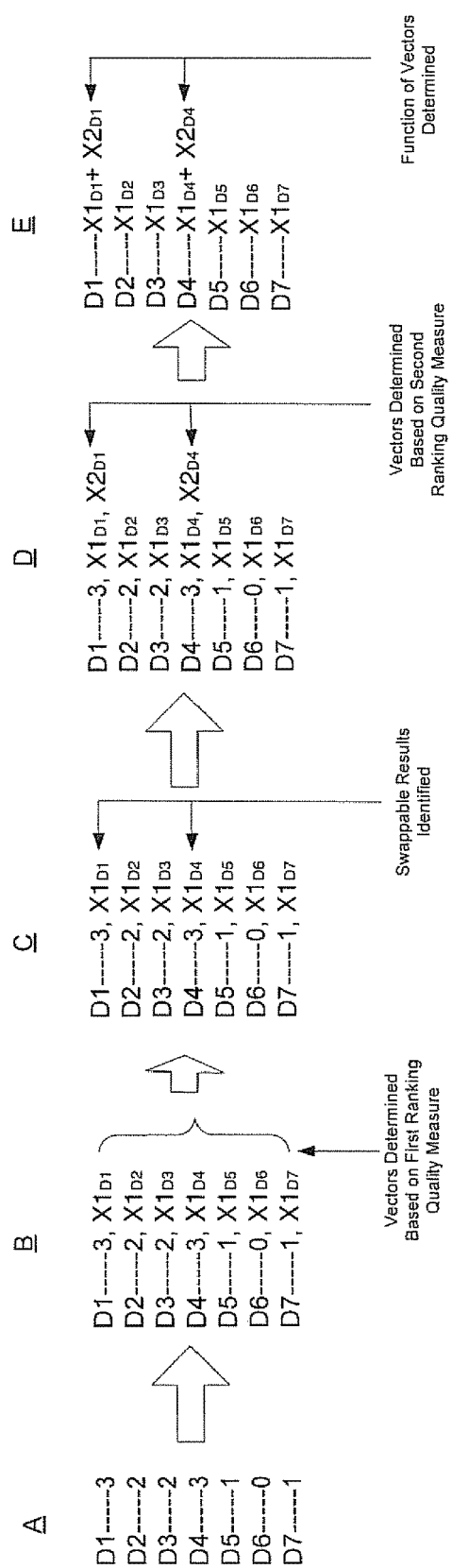
FIG. 2 illustrates the operation of a system for multi-tiered information retrieval training according to one embodiment.

FIG. 2 illustrates the operation of system 101b for multi-tiered information retrieval training according to one embodiment. These operations, which relate to the ranking of documents, are illustrated for purposes of clarity and brevity. However, it should be appreciated that other operations which relate to the ranking of other types of identified information sources not shown in FIG. 2 can be performed in accordance with one embodiment.

At A, a learning to rank algorithm (e.g., 101a in FIG. 1) generates a ranked ordering of documents D1-D7 that have been identified based on a specific query. As shown in FIG. 2, each of the documents are assigned a score (0-3) that indicates its relevance to the query. At B a first vector ($X1_{D1}$-$X1_{D7}$) is calculated for each of the documents ranked by the learning to rank algorithm. At C documents are identified that can be swapped without changing a score provided by a first ranking quality measure.

To determine which documents of the ranked ordering of documents can be swapped without changing the score provided by the first ranking quality measure, the details of the computation of the first ranking quality measure can be examined. For example, consider the case where the first ranking quality measure is NDCG. To compute the NDCG score the gain and discount are computed. The gain, which is based on the relevance score that is assigned each of the results shown in FIG. 2, is computed as follows:

$$\text{gain} = 2^{rel_i} - 1$$

As a part of the discount computation a logarithmic scale is used to reduce the individual value (such as scores, relevance labels, etc.) of the gain in a manner that emphasizes the scores of documents appearing early in the result list. Using the logarithmic scale for reduction, the discount for each result is determined as follows:

$$\text{discount at position } t = \log_2(1+t)$$

The discounted cumulative gain (DCG) is computed based on the gains and discounts, as shown below in Table 1.

TABLE 1

| position t | $rel_i$ | Gain | 1/discount | gain/discount |
|---|---|---|---|---|
| 1 | 3 | 7 | 1.44 | 10.08 |
| 2 | 2 | 3 | 0.91 | 2.73 |
| 3 | 2 | 3 | 0.72 | 2.16 |
| 4 | 3 | 7 | 0.62 | 4.34 |
| 5 | 1 | 1 | 0.56 | 0.56 |
| 6 | 0 | 0 | 0.51 | 0.0 |
| 7 | 1 | 1 | 0.48 | 0.48 |

The DCG of this ranking is computed as follows:

$$DCG = \sum_{t=1}^{p} \frac{\text{gain}}{\text{discount}}$$
$$= 10.08 + 2.73 + 2.16 + 4.34 + 0.56 + 0.0 + 0.48$$
$$= 20.35$$

As is apparent from a review of Table 1, the character of the DCG computation is such that swapping documents that have different scores would result in a change of the DCG score. However, swapping documents that have identical scores, such as the first, D1 (score 3), and fourth, D4 (score 3), ranked documents would not change the DCG score. This character of the DCG computation facilitates the straightforward identification of swappable documents because a change in the DCG score would cause a corresponding change in the NDCG score (the NDCG score is determined by dividing the DCG score by the DCG of the ideal ordering of the scores). Accordingly, in this manner documents D1 and D4 are readily identified as being swappable at C.

Referring again to FIG. 2, at D a second vector ($X2_{D1}$ and $X2_{D4}$) is determined for the documents that are identified as being swappable in operation C based on a second ranking quality measure. At E the first and second vectors are added to determine the vector that is actually assigned to these documents for prospective training purposes. In one embodiment, the vectors are combined to obtain a function of the first and second vectors. In one embodiment, the function can be an unweighted sum of the first vector and the second vector. In another embodiment, the function can be a weighted sum of the first vector and the second vector. In one embodiment, the function can involve an addition of the first vector and the second vector in an arbitrary or non-arbitrary manner. In one embodiment, vector training proceeds until scoring provided by the ranking quality measures that are used have been maximized.

In exemplary embodiments, using operations such as those discussed above, the maximization of the scoring that is provided by a plurality of ranking quality measures is enabled in a tiered manner. In particular, exemplary embodiments enable not only an attainment of the maximum value for a first ranking quality measure on unseen data, but also enable the improvement of at least one other ranking quality measure without degrading the scoring provided by the first ranking quality measure.

Although the above example described with reference to FIG. 2 involves the use of two tiers of ranking quality measures, more than two tiers can be used. For example, in one embodiment, the top tier can be an NDCG ranking quality measure, the second tier a click-based ranking quality measure and a third tier a freshness based ranking quality measure (that measures how recently the returned document was created or updated by the user). However, in other embodiments, other ranking quality measure combinations can be used. In general, in one embodiment, the use of the multiple tiers of ranking quality measures can be provided to compensate for limitations inherent in individual ranking quality measures.

Figure 3:
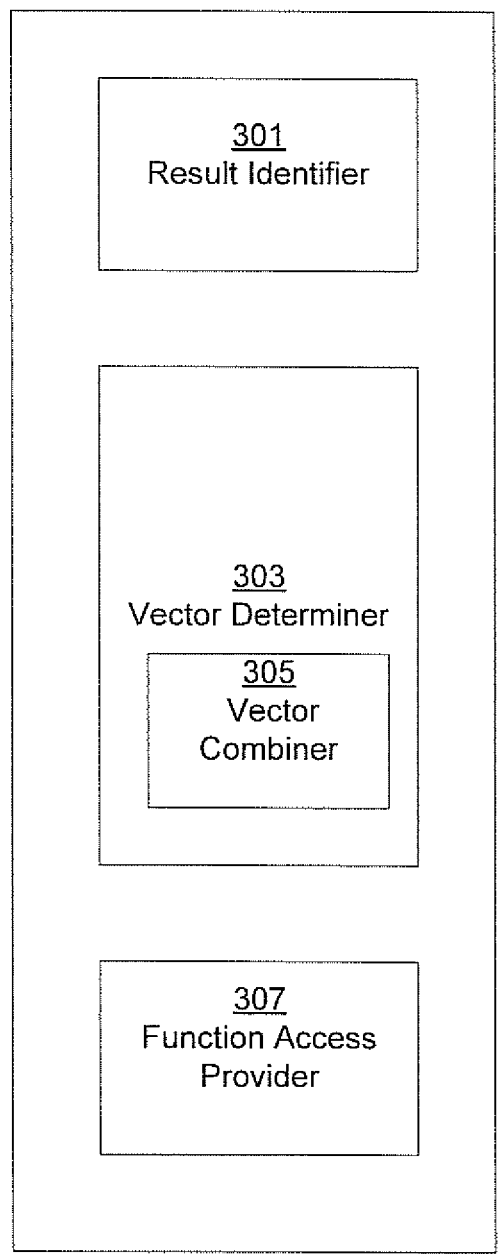
FIG. 3 shows components of a system for multi-tiered information retrieval training according to one embodiment.

Components of System for Multi-Tiered Information Retrieval Training According to Embodiments FIG. 3 shows components of a system 101b for multi-tiered information retrieval training according to one embodiment. In one embodiment, components of system 101b implement an algorithm for multi-tiered information retrieval training. In the FIG. 3 embodiment, components of system 101b include result identifier 301, vector determiner 303, vector combiner 305 and function access provider 307.

Referring to FIG. 3, result Identifier 301 identifies one or more pairs of results among a ranked ordering of results that can be swapped without changing the score of the ranking performance that is provided by a first ranking quality measure. In one embodiment, results that can be swapped without changing the score provided by the first ranking quality measure include but are not limited to results that have been assigned the same relevance label.

Vector determiner 303 determines vectors for each of the ranked results based on a first ranking quality measure and for the pairs of results identified as being able to be swapped based on at least one other ranking quality measure. In one embodiment, vector determiner 303 can include a vector combiner 305 that adds the first and second vectors for each of the identified swappable results, that are determined based on the first and second tier ranking quality measures respectively. In one embodiment, the vectors are combined to obtain a function of the first and second vectors. In one embodiment, the function can be an unweighted sum of a first vector and at least one other vector. In another embodiment, the function can be a weighted sum of a first vector and at least one other vector. In one embodiment, the function can involve an addition of the first vector and at least one other vector in an arbitrary or non-arbitrary manner. In one embodiment, the function of the first and second vectors for each of the swappable results determines the actual vector (e.g., magnitude and direction) that is associated with the respective swappable results for training purposes. In one embodiment, vector combiner 305 can be separate from vector determiner 303.

Function access provider 307 provides access to the function of the first vector and the at least one other vector for use in multi-tiered information retrieval training. This information is used to form a ranking model for ranking unseen items based on multi-tiered information retrieval training.

It should be appreciated that the aforementioned components of system 101b can be implemented in hardware or software or in a combination of both. In one embodiment, components and operations of system 101b can be encompassed by components and operations of one or more computer programs (e.g., information retrieval system 101 in FIG. 1). In another embodiment, components and operations of system 101b can be separate from the aforementioned one or more computer programs but can operate cooperatively with components and operations thereof.

Method for Multi-Tiered Information Retrieval Training According to Embodiments

Figure 4:
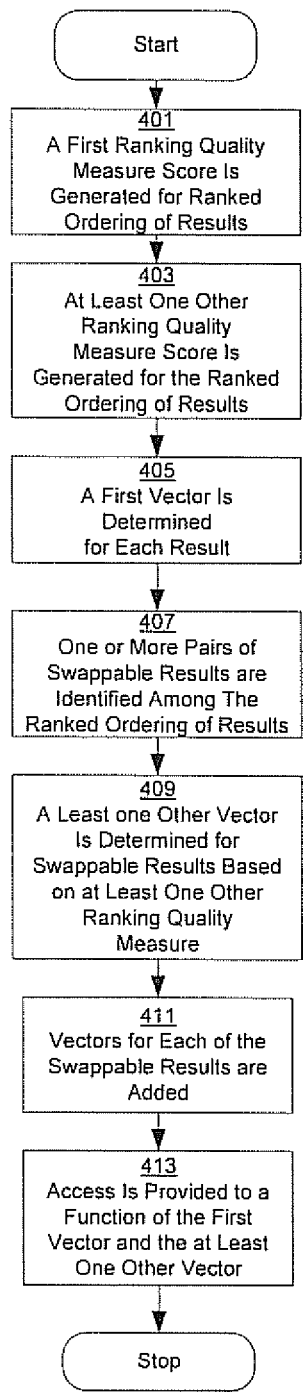
FIG. 4 shows a flowchart of the steps performed in a method for multi-tiered information retrieval training according to embodiments.

FIG. 4 shows a flowchart 400 of the steps performed in a method for multi-tiered information retrieval training according to embodiments. The flowchart includes processes that, in one embodiment can be carried out by processors and electrical components under the control of computer-readable and computer-executable instructions. Although specific steps are disclosed in the flowcharts, such steps are exemplary. That is the present embodiments are well suited to performing various other steps or variations of the steps recited in the flowchart. Within various embodiments, it should be appreciated that the steps of the flowchart can be performed by software, by hardware or by a combination of both.

Referring to FIG. 4, at step 401a first ranking quality measure score is generated for a ranked ordering of results returned from a query. In one embodiment, the first ranking quality measure can include but is not limited to an NDCG ranking quality measure.

At step 403, at least one other ranking quality measure score is generated for the ranked ordering of results returned from the query. In one embodiment, the at least one other ranking quality measure can include but is not limited to a ranking quality measure based on user clicks, user dwell time and query chains. Other ranking quality measures can include but are not limited to ranking quality measures based on spamness (likelihood of being spam), freshness (recency of the data), and grammaticality (the quality of the written language).

At step 405, a first vector is determined for each result of the ranked ordering of results based on the first ranking quality measure. In one embodiment, an element of the function that is used to determine the first vector can be derived from the first ranking quality measure.

At step 407, one or more pairs of results are identified among the ranked ordering of results that can be swapped without changing the score provided by the first ranking quality measure. In one embodiment, similar relevance labeling can be used to identify results that can be swapped without changing the score provided by the first ranking quality measure. In other embodiments other characteristics can be used to identify results that can be swapped without changing the score provided by the first ranking quality measure.

At step 409, at least one other vector is determined, based on the at least one other ranking quality measure, for each result that is identified as being able to be swapped without changing the score of the first ranking quality measure. In one embodiment, an element of a cost function used to determine the at least one other vector is derived from the at least one other ranking quality measure.

At step 411, vectors for each of the swappable results, determined based on the first ranking quality measure are combined with vectors for these results that are determined based on the at least one other ranking quality measure to obtain a function of the vectors. And, at step 413, access is provided to the function of the first vector and the at least one other vector for use in multi-tiered information retrieval training. A ranking model is produced for ranking unseen items based on the aforementioned multi-tiered information retrieval training.

Exemplary Hardware According to One Embodiment

Figure 5:
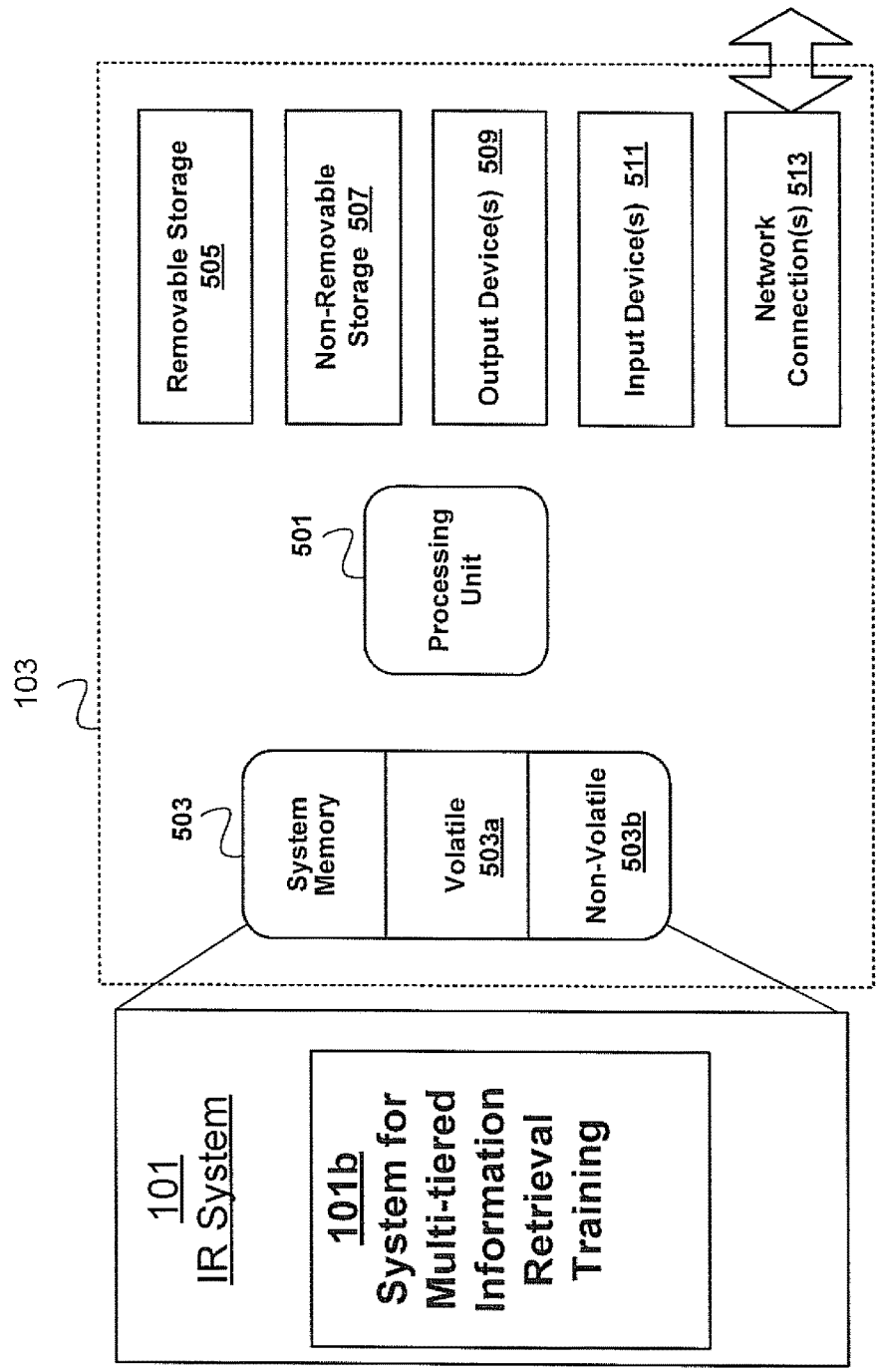
FIG. 5 shows an exemplary computer system according to one embodiment.

FIG. 5 shows an exemplary computer system 103 according to one embodiment. In the FIG. 5 embodiment, computer system 103 can include at least some form of computer readable media. Computer readable media can be any available media that can be accessed by computer system 103 and can include but is not limited to computer storage media.

In its most basic configuration, computer system 103 typically includes processing unit 501 and memory 503. Depending on the exact configuration and type of computer system 103 that is used, memory 503 can be volatile (such as RAM) 503a, non-volatile 503b (such as ROM, flash memory, etc.) or some combination of the two. In one embodiment, IR system 101 and system 101b for multi-tiered information retrieval training such as are described herein can reside in memory 503.

Additionally, computer system 103 can include mass storage systems (removable 505 and/or non-removable 507) such as magnetic or optical disks or tape. Similarly, computer system 103 can include input devices 511 and/or output devices 509 (e.g., such as a display). Additionally, computer system 103 can include network connections 513 to other devices, computers, networks, servers, etc. using either wired or wireless media. As all of these devices are well known in the art, they need not be discussed in detail.

With reference to exemplary embodiments thereof methods and systems for multi-tiered information retrieval training are disclosed. A method includes identifying results in a ranked ordering of results that can be swapped without changing a score determined using a first ranking quality measure, determining a first vector and at least one other vector for each identified swappable result in the ranked ordering of results based on the first ranking quality measure and at least one other ranking quality measure respectively, and combining the first vector and the at least one other vector for each identified swappable result in the ranked ordering of results to obtain a function of the first vector and the at least one other vector. Access is provided to the function of the first vector and the at least one other vector for use in the multi-tiered information retrieval training.

The foregoing descriptions of specific embodiments have been presented for purposes of illustration and description. They are not intended to be exhaustive or to limit the embodiments to the precise forms disclosed, and obviously many modifications and variations are possible in light of the above teaching. The embodiments were chosen and described in order to best explain their principles and practical application, to thereby enable others skilled in the art to best utilize various embodiments with various modifications as are suited to the particular use contemplated. It is intended that the scope of the embodiments be defined by the Claims appended hereto and their equivalents.

Although the subject matter has been described in language specific to structural features and/or methodological acts, it is to be understood that the subject matter defined in the appended claims is not necessarily limited to the specific features and acts described above. Rather, the specific features and acts described above are disclosed as example forms of implementing the Claims.

What is claimed is:

1. A method for multi-tiered information retrieval training, the method comprising:
  forming a ranking model used to rank search results for search queries by:
    in a set of results that are ranked and ordered and that includes pairwise swappable results and non-pairwise swappable results, identifying, by a processing unit, a first result and a second result of the set of results that share a same relevance label such that the first and second results are pairwise swappable and such that a score, determined for said set of results using a normalized discounted cumulative gain (NDCG) ranking quality measure based on relevance scores of the set of results, remains the same if a first place of the first result in the set of results is swapped with a second place of the second result of the set of results, wherein a total count of the set of results is greater than two;
    determining, using said processing unit, a first vector for each result in the set of results based on said NDCG ranking quality measure, the first vector contributing to a particular determination regarding how the first and second results are to move up or down in ranking within the set of results;
    based on the first and second results being pairwise swappable, determining, using said processing unit, a second vector for the first and second results based on a ranking quality measure selected from a group consisting of a user click quality ranking quality measure, a user dwell time quality ranking measure, a freshness ranking quality measure, a spamness ranking quality measure, and a grammaticality ranking quality measure, such that only the first and second results sharing same relevance labels are associated with the second vector, the second vector also contributing to the particular determination regarding how the first and second results are to move up or down in ranking within the set of results;
    combining, using said processing unit, said first and second vectors for the first result in the set of results to obtain, for said first result, a first function;
    combining, using said processing unit, said first and second vectors for the second result in the set of results to obtain, for said second result, a second function;
    based on the first function and on the second function, by said processing unit, performing the particular determination by determining which of the first and second results is to move up or down in ranking within the set of results to generate actual rankings and forming said ranking model used to rank search results for search queries with the actual rankings rather than the same relevance label originally assigned to the first and second results; and
  using said ranking model in an information retrieval system to subsequently identify search results for search queries.

2. The method of claim 1 wherein said first vector and said second vector of either the first or second results are one of: a direction and magnitude that are based on a cost function; and a direction and magnitude that are not based on a cost function.

3. The method of claim 1 wherein said first function or said second function is one of: an unweighted sum of said first vector and said second vector of either the first or second results; and a weighted sum of said first vector and said second vector of either the first or second results, and wherein an addition of said first vector and said second vector of either the first or second results is one of: arbitrary; and non-arbitrary.

4. The method of claim 1 wherein the first function or the second function is associated with a corresponding one of said results in said set of results that are ranked and ordered for prospective vector training.

5. The method of claim 1 wherein the first function or the second function causes an adjustment in a score of said ranking model.

6. The method of claim 1 wherein the first function or the second function indicates a direction and magnitude that is associated with a corresponding one of said first and second ones of said results.

7. The method of claim 1 wherein said identifying includes identifying, by said processing unit, that said first and second ones of said results are pairwise swappable based on a first relevance score of said first one of said results being the same as a second relevance score of said second one of said results.

8. A method for forming a ranking model used to rank search results for search queries, the method comprising:
  forming said ranking model used to rank search results for search queries by:
    in a set of results that are ranked and ordered and that includes pairwise swappable results and non-pairwise swappable results, identifying, by a processing unit, a first result and a second result of the set of results that are pairwise swappable and that share a same relevance label such that a score, determined for said set of results using a normalized discounted cumulative gain (NDCG) ranking quality measure based on relevance scores of the set of results, remains the same if a first place of the first result in the set of results is swapped with a second place of the second result of the set of results, wherein a total count of the set of results is greater than two;

determining, by said processing unit, a first vector for each result in the set of results based on said NDCG ranking quality measure, the first vector contributing to a particular determination regarding how the first and second results are to move up or down in ranking within the set of results;

based on the first and second results being pairwise swappable, determining, using said processing unit, a second vector for the first and second results based on a ranking quality measure selected from a group consisting of a user click quality ranking quality measure, a user dwell time ranking quality measure, a freshness ranking quality measure, a spamness ranking quality measure, and a grammaticality ranking quality measure, such that only the first and second results sharing same relevance labels are associated with the second vector, the second vectors also contributing to the particular determination regarding how the first and second results are to move up or down in ranking within the set of results;

combining, using said processing unit, said first and second vectors for the first result in the set of results to obtain for the first result a first function;

combining, using said processing unit, said first and second vectors for the second result in the set of results to obtain, for said second result, a second function;

based on the first function and on the second function, using said processing unit, performing the particular determination by determining which of the first and second results is to move up or down in ranking within the set of results to generate actual rankings and forming said ranking model used to rank unseen items with the actual rankings rather than the same relevance label originally assigned to the first and second results; and using said ranking model in an information retrieval system to subsequently identify search results for search queries.

9. The method of claim 8 wherein said first vector and said second vector of either the first or second results are one of a direction and magnitude that are based on a cost function and a direction and magnitude that are not based on a cost function.

10. The method of claim 8 wherein said first function or said second function is one of: an unweighted sum of said first vector and said second vector of either the first or second results; and a weighted sum of said first vector and said second vector of either the first or second results, and wherein an addition of said first vector and said second vector is one of: arbitrary; and non-arbitrary.

11. The method of claim 8 wherein forming said ranking model includes adjusting a score of said ranking model based on said first function and said second function.

12. The method of claim 8 wherein said first and second functions indicate directions and magnitudes that are associated with said first and second ones of said results, respectively.

13. The method of claim 12 wherein said identifying includes, identifying, by said processing unit, that said first and second ones of said results are pairwise swappable based on a first relevance score of said first one of said results being the same as a second relevance score of said second one of said results.

14. At least one computer-readable memory having computer-executable instructions executed by at least one processing unit to train a model using multi-tiered ranking quality measures, enabling maximization of a value of a first ranking quality measure on unseen data while enabling improvement of at least one other ranking quality measure on said unseen data, without degrading scoring provided by said first ranking quality measure, said instructions that, when executed by said at least one processing unit, cause said at least one processing unit to perform functions comprising:

forming a ranking model used to rank search results for search queries by:

in a set of results that are ranked and ordered and that includes pairwise swappable results and non-pairwise swappable results, identifying a first result and a second result of the results that share a same relevance label such that the first and second results are pairwise swappable and such that a score, determined for said set of results using a normalized discounted cumulative gain (NDCG) ranking quality measure based on relevance scores of the set of results, remains the same if a first place of the first result in the set of results is swapped with a second place of the second result of the set of results;

determining a first vector for each result in the set of results based on said normalized discounted cumulative gain (NDCG) ranking quality measure, the first vector contributing to a particular determination regarding how the first and second results are to move up or down in ranking within the set of results;

based on the first and second results being pairwise swappable, determining a second vector for the first and second results based on a ranking quality measure selected from the group consisting of a user click quality ranking quality measure, a user dwell time ranking quality measure, a freshness ranking quality measure, a spamness ranking quality measure, and a grammaticality ranking quality measure, such that only the first and second results sharing same relevance labels are associated with the second vector, the second vector also contributing to the particular determination regarding how the first and second results are to move up or down in ranking within the set of results;

combining said first and second vectors for the first result in the set of results to obtain, for the first result, a first function;

combining said first and second vectors for the second result in the set of results to obtain, for said second result, a second function;

based on the first function and on the second function, performing the particular determination by determining which of the first and second results is to move up or down in ranking within the set of results to generate actual rankings and training the ranking model used to rank search results for search queries with the actual rankings rather than the same relevance label originally assigned to the first and second results; and using said ranking model to subsequently identify search results for search queries.

15. The at least one computer-readable memory of claim 14 wherein said first vector and said second vector of either the first or second results are one of: a direction and magnitude that are based on a cost function; and a direction and magnitude that are not based on a cost function.

16. The at least one computer-readable memory of claim 14 wherein said first function or said second function is one of: an unweighted sum of said first vector and said second vector of either the first or second results and a weighted sum of said first vector and said second vector of either the first or second results, and wherein an addition of said first vector and said second vector is one of: arbitrary; and non-arbitrary.

17. The at least one computer-readable memory of claim 14 wherein said instructions for training said ranking model include adjusting a score of said ranking model based on said first function and said second function.

18. The at least one computer-readable memory of claim 14 wherein said first and second functions indicate directions and magnitudes that are associated with said first and second ones of said results, respectively.

* * * * *